Patented Nov. 3, 1936

2,059,646

UNITED STATES PATENT OFFICE 2,059,646

Bz2-HALOGEN-BENZANTHRONES

Melvin A. Perkins, Milwaukee, Wis., assignor to E. I. du Pont de Nemours & Company, Wilmington, Del., a corporation of Delaware No Drawing. Application May 25, 1935, Serial No. 23,455

6 Claims. (Cl. 260—61)

This invention relates to a method for preparing Bz2-halogen-benzanthrone compounds and to new compounds obtainable by such process. More particularly the invention resides in the preparation of Bz2-bromo-benzanthrone and Bz2-iodo-benzanthrone and their halogen derivatives wherein the halogen is present in the anthraquinone nucleus, and to a method for preparing Bz2-halogen-benzanthrones generally.

It is known that Bz2-chloro-benzanthrone can be prepared from Bz1-amino-benzanthrone by first acetylating the amino group, chlorinating the resulting product and then eliminating the acetylamino radical by splitting off the acetyl group with subsequent diazotization and reduction of the diazo compound by known procedure.

I have found that it is impossible to introduce iodine into the Bz ring of the benzanthrone molecule by this known procedure. Although one atom of bromine can be introduced into the molecule to give a bromo-benzanthrone which appears to be a relatively pure product, having a melting point of 148–153° C., I have found that on the elimination of the Bz ring by oxidation, approximately one-half of the bromine remains in the resulting anthraquinone product, while in those compounds prepared by the herein described process, it is substantially all removed by elimination of the Bz ring under the same conditions.

I have found that Bz2-amino-benzanthrone obtainable according to Example 2 of U. S. Patent 876,679 can be converted to the Bz2-halogen-benzanthrone by diazotization of the amino group and direct substitution of the latter by chlorine, bromine or iodine according to the Sandmeyer reaction. I have found that bromine and iodine, as well as chlorine, can be introduced into the Bz2 position by this method, the bromo- and iodo-compounds being new products not obtainable by the heretofore known methods for preparing Bz2-chloro-benzanthrones.

It is therefore an object of this invention to prepare as new products Bz2-bromo-benzanthrones and Bz2-iodo-benzanthrones, which compounds are valuable intermediates for the preparation of dyestuffs.

It is a further object of this invention to provide a process for preparing Bz2-halogen-benzanthrones generally and by which method the Bz2-bromo- and Bz2-iodo-benzanthrones can be satisfactorily prepared.

The following examples more fully illustrate my invention. The parts used are by weight.

Example 1

12.3 parts of Bz2-amino-benzanthrone (obtainable by sodium sulfide reduction of the nitrobenzanthrone, M. P. 298°, obtained as in Example 2 of U. S. Patent No. 876,679) are dissolved in 123 parts of 66° Bé. sulfuric acid and treated at 10–20° with 3.6 parts of finely ground sodium nitrite. After stirring 2 to 3 hours, the diazonium sulfate solution is poured carefully onto 300 parts of cracked ice, keeping the temperature below 20° C. The thick mush is filtered and sucked as dry as possible. The filter cake is then slurried in 200 parts of 20° Bé. hydrochloric acid and added slowly to a well agitated solution of 12 parts of cuprous chloride in 150 parts of 20° Bé. hydrochloric acid. There is a strong evolution of gas. The mixture is warmed gently and diluted little by little to give approximately 19–20% HCl; then the temperature is raised to 80–100° until gas evolution stops. The mixture is largely diluted with water, filtered, washed acid free, and the solid dried. The crude Bz2-chloro-benzanthrone thus prepared melts at about 168–175°. It can be purified by recrystallization from acetic acid, preferably with the addition of decolorizing carbon. When mixed with the Bz2-chloro-benzanthrone (prepared from Bz2-chloro-Bz1-amino-benzanthrone by diazotization with subsequent reduction of the diazonium salt by known methods), there is no depression in melting point, showing the two to be identical and not isomeric.

Example 2

100 parts of Bz2-amino-benzanthrone are diazotized in accordance with the directions of Example 1. The diazonium sulfate filter cake is slurried in 1200 parts of constant boiling hydrobromic acid and the suspension added slowly under the surface of a solution of 108 parts of cuprous bromide in 1000 parts of constant boiling hydrobromic acid. Nitrogen evolution starts at once and continues until the mass is heated for some time at 80–100° C. After gas evolution ceases, the mass is diluted and filtered. The cake of crude Bz2-bromo-benzanthrone is washed and dried. By two recrystallizations from acetic acid to which a small amount of water has been added, Bz2-bromo-benzanthrone is obtained as a pale brownish-yellow crystalline powder, melting at 188–192°, containing approximately 25% bromine and giving an orange red color in sulfuric acid solution. Oxidation with chromic-acetic acid mixture gives anthraquinone-1-carboxylic acid.

By using an aqueous solution of potassium iodide to decompose the diazonium sulfate in the above example, there is obtained a crude Bz2-iodo-benzanthrone which can be purified in the same manner as the bromo derivative. The purified Bz2-iodo-benzanthrone melts at 176–180° C., contains approximately 34% iodine, and gives a bright orange-red color in sulfuric acid (no fluorescence).

It is of course understood that Bz2-halogen-benzanthrones containinng halogen in the anthraquinone group can also be prepared by this method. To prepare these halogen substitution products, alpha- or beta-chloro-benzanthrones are nitrated to produce the Bz2-nitro-alpha- or beta-halogen-benzanthrone, which is then reduced, diazotized, and converted to the Bz2-halogen-alpha- or beta-halogen-benzanthrone. The alpha- or beta-halogen benzanthrones are prepared by known methods from alpha- or beta-halogen-anthraquinones.

It is understood that diazotization of the amine compound may be carried out by any of the known methods. The diazotization may be carried out in hydrochloric or acetic acid solutions or suspensions and organic nitrites, nitrous oxides, etc., may be used.

I claim:

1. Bz2-halogen-benzanthrones of the group consisting of Bz2-bromo-benzanthrone, Bz2-iodo-benzanthrone and their halogen substitution products wherein the halogen is contained in the anthraquinone nucleus.

2. Bz2-bromo-benzanthrone.

3. Bz2-iodo-benzanthrone.

4. The process for preparing Bz2-halogen-benzanthrones which comprises diazotizing a Bz2-amino-benzanthrone and reacting the resulting diazo compound with a metal halide adapted to replace the diazo group with halogen.

5. The process for preparing Bz2-bromo-benzanthrones which comprises diazotizing a Bz2-amino-benzanthrone and reacting the resulting diazo compound with cuprous bromide to effect a substitution of the diazo group by bromine.

6. The process for preparing Bz2-iodo-benzanthrones which comprises diazotizing a Bz2-amino-benzanthrone and reacting the resulting diazo compound with an alkali-metal iodide to effect substitution of the diazo group by iodine.

MELVIN A. PERKINS.